United States Patent Office 3,672,845
Patented June 27, 1972

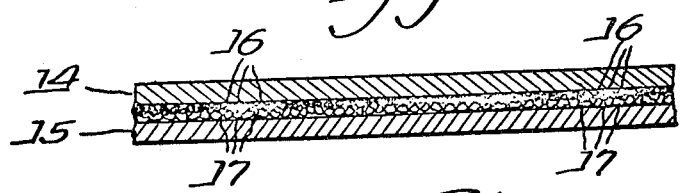
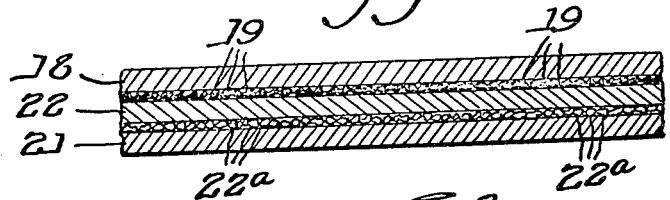
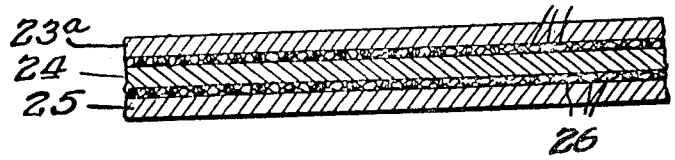

3,672,845
TEST DEVICE FOR ALBUMIN
Bruno J. Verbeck, Lombard, Ill., assignor to Miles
Laboratories, Inc., Elkhart, Ind.
Continuation of application Ser. No. 703,002, Feb. 5, 1968. This application July 28, 1970, Ser. No. 64,090
Int. Cl. G01n 31/22, 33/16
U.S. Cl. 23—253 TP
10 Claims

ABSTRACT OF THE DISCLOSURE

A testing device for the detection of albumin in urine in the form of a carrier, such as a plastic sheet material, which has had applied thereover a layer of particulate hydrophilic absorptive material, a portion of which has been first impregnated with a solution of an indicator which exhibits protein error and then dried, and a second portion of particulate material which has been impregnated with a solution of a buffer compound for maintaining the urine with which the device is to come in contact at a pH which is within or below the range through which the indicator changes color due to a change in pH. The device may also comprise a carrier which has had applied thereon a layer composed of agglomerates of particulate hydrophilic absorptive material, such as aluminum oxide, silica gel, cellulose, exfoliated vermiculite or the like, which agglomerates have been formed by first compressing into a compacted form a mixture of the said particulate material which has been prepared by first impregnating one portion of it with a solution of indicator which exhibits protein error and then dried, and a second portion with a solution of a buffer and thereafter particulating the compacted form so as to form agglomerates composed of the two kinds of discrete particles of the hydrophilic absorptive material and the indicator and buffer with which said particles have been impregnated.

---

This application is a streamlined continuation of S.N. 703,002, filed Feb. 5, 1968, now abandoned.

DESCRIPTION OF THE DISCLOSURE

This invention is concerned with a new and useful testing device for the determination and detection of albumin in urine.

Test devices for the detection of albumin in urine, in the form of paper strips which have been dipped in a solution of various chemicals and then dried, have come into widespread use because they have made it possible for the first time to detect albumin in urine in a simple, convenient way without the necessity of using laboratory equipment, liquid reagents, test tubes, Bunsen burners and the like, or technical personnel skilled in carrying out conventional types of clinical tests. The aforesaid test devices represent an important contribution to the art and science of diagnosis.

The present invention has as one object the provision of an improved testing device for the determination and detection of albumin in urine.

A further object is the provision of a new and useful testing device for the detection of albumin in urine, having improved performance characteristics.

A further object is the provision of a new and useful testing means, having improved reproducibility characteristics, for the detection of albumin in urine, which does not require skilled personnel, liquid reagents, heat, test tubes and the like.

Broadly stated, the present invention encompasses an indicator device for determining albumin in urine, which comprises (1) a dry hydrophilic absorbent material which incorporates an indicator dye which exhibits protein error resulting from impregnation of said absorbent material with a solution of said indicator followed by drying, and (2) a dry hydrophilic absorbent material which incorporates a buffer material deposited therein from an impregnation with a solution of said buffer followed by drying, the buffer being present in such amount and being of such a type that the pH of urine with which said absorbent material comes in contact during the carrying out of the test, is maintained within or below the range through which the aforesaid indicator changes color in response to a change in pH. The two, thus-treated dry hydrophilic absorbent materials together are formed into a single integral testing unit which, in use, is contacted with a specimen of urine and the color change, if any, observed to determine the presence or absence of albumin in that urine.

It is, thus, an essential feature of this invention that the indicator and the buffer be, each of them, incorporated in separate particles of hydrophilic absorbent particulate material. That is to say, in the test device itself the hydrophilic, absorbent, particulate material is composed of a dry mixture of (a) particles which have been impregnated with a solution of the indicator and then dried, and (b) particles which have been impregnated with a solution of a buffer material and then dried.

Hydrophilic, absorbent, particulate, material which may be used in the practice of my invention includes silica gel, aluminum oxide, powdered cellulose, exfoliated vermiculite and the like.

The indicator dye used may be any one of those which exhibits protein error, as typified by Bromphenol blue, Tetrabromphenol blue, Tetrabromphenol phthalein ethyl ester, Bromcresol green, m(p-anilinophenylazo) benzene sulfonic acid sodium salt; the buffer materials may be in the form of solid acids or acid salts provided the acid or the acid salt is capable of lowering the pH of the urine which comes into contact with the indicator device to, maintaining it at, a pH within or below the range within which the particular indicator with which it is to be used, changes color due to a change in pH. Among the acids which may be used, singly or in combination with their salts, are citric, tartaric, maleic, ascorbic, salicylic, sulfosalicylic, oxalic, itaconic, gluconic, sulfamic, succinic benzoic, mandelic, glutaric, malic and phthalic.

The mixture of indicator-impregnated and buffer-impregnated particulate material, as above described, may be secured with an adhesive and/or pressure to one or more surfaces of a carrier which may itself be hydrophilic-absorbent material such as paper in sheet form, or it may be in the form of a hydrophobic or hydrophilic non-absorbent sheet material. Dry particulate material, such as silica gel, aluminum oxide, powdered cellulose, exfoliated vermiculite, or the like, may be added, per se, to the mixture of the dried indicator-impregnated particles and buffer-impregnated particles. If such particulate material is added, it is desirable that it have incorporated therein a wetting agent preferably dried after such incorporation, so that those dry particles would be, preferentially, more readily wetted by the urine specimen with which the whole indicator device is subsequently contacted.

Typical of suitable wetting agents are, for example, Aerosol OT (di(2-ethylhexyl) ester of sodium sulfo-succinic acid; Tween 20 (tris(polyoxyethylene) sorbitan monolaurate; and Tween 80 (tris(polyoxyethylene) sorbitan monooleate).

The dry indicator-impregnated component, and the dry buffer-impregnated component, with or without added cellulose powder, aluminum oxide, silica gel, exfoliated vermiculite or other particulate material, may be compacted, as in a pill-forming machine to form compressed, frangible structures, which may be secured to a carrier, such as a strip of paper, plastic or the like, by any suitable means, and the test carried out by dipping the resulting device into a urine specimen and observing the appearance or non-appearance of a color change. Or, the compressed, frangible structure may be fractured and particulated to a limited extent to form irregularly shaped agglomerates of the component particles, having essentially the same composition as the un-fractured, which agglomerates are then applied suitably by means of adhesive to a carrier strip such as above described. It is a particular advantage of this form of the invention that the albumin detection test is carried out more rapidly and more effectively since the irregular surface character of such agglomerates provides substantially more surface area and results in more rapid wetting and quicker achievement of the test.

The invention will be further illustrated by reference to the accompanying drawings in which:

FIG. 1 is a view of an embodiment showing a sheet material having attached to one surface thereof absorbent particles containing thereon, or therewithin, an indicator dye which exhibits protein error, and particles containing thereon, or therewithin, a buffer composition for maintaining the pH of the urine with which said embodiment is to be contacted, at a predetermined pH.

FIG. 2 shows an embodiment of my invention wherein a carrier has attached to at least one surface thereof a layer or coating of absorbent particles containing thereon or therewithin an indicator dye which exhibits protein error, the said coated surface being in physical contact with a second carrier having attached thereto a layer of absorbent particles which have been treated with, and contain therein, or thereon, a buffer. The two thus-coated carriers are then attached to each other as by treating one or both coated surfaces with an adhesive followed by pressing the coated faces together.

FIG. 3 shows a form of my invention generally similar to that shown in FIG. 2, but having additionally positioned as shown, an absorbent hydrophilic sheet material between, and separating the two outer sheets, one of which has on its particulate materials which have been treated with dye, and the other a buffer, the whole forming an integral unit.

FIG. 4 shows another embodiment of my invention similar to that shown in FIG. 3 except that the particulate coating contains, in addition, absorbent particulate material which does not contain added reactants.

FIG. 5 shows another embodiment of my invention wherein a carrier has secured to it agglomerates, which agglomerates comprise a mixture of particulate material which has been impregnated with a solution of an indicator component which exhibits protein error, and then dried, in admixture with particulate material which has been impregnated with a buffer material and then dried, which mixture has been compacted to form a compressed frangible structure, and the resulting structure then particulated to form the said agglomerates.

Referring further to FIG. 1, the device there shown comprises a sheet 11 of material, which is suitably an absorbent hydrophilic paper which has adhesively secured to at least one surface thereof, a uniform, continuous layer of homogeneous mixture of particles 12 and 13. Particles 12 can be, for example, powdered cellulose, alumina, silica gel, exfoliated vermiculite or the like, which material has been treated with one of the indicators such as described above, which exhibits the phenomenon known in the art as protein error, which indicator material can be applied into, or onto, the particulate material by impregnating the particulate material with a solution of the dye, followed by drying.

Particles 13 comprise particulate material such as powdered cellulose, alumina, silica gel, exfoliated vermiculite, or the like, which material has been impregnated with a solution of buffer material, which may consist of a salt as described above, or mixtures thereof, for the purpose of buffering the urine which comes in contact therewith within or below the range through which the indicator used in preparing particles 12 changes color due to a change in pH. This buffer-containing material is likewise dried after preparation.

The dry indicator-impregnated particles 12 and the dry buffer-impregnated particles 13 are mixed to form a homogeneous mixture and the resulting mixture of particles then adhesively secured to sheet 11 by means of any suitable adhesive, of which pressure-sensitive adhesives are typical. A suitable adhesive is a butadiene-styrene rubber-based adhesive having a high solids content in relation to the solvent content. Such butadiene-styrene rubber-based adhesive lends itself to application in the form of a spray from an aerosol container without unduly misting or becoming stringy during application. An example of a presently commercially available produce is that marketed by Minnesota Mining and Manufacturing Corporation of St. Paul, Minn., and identified as "Adhesive Spray No. 77."

With further reference to FIG. 2, it shows a test device comprising sheets 14 and 15, suitably of hydrophilic, absorbent material such as paper, each of which has adhesively secured thereto a uniform, continuous layer of particulate material. Particles 16 may be either powdered cellulose, aluminum oxide, silica gel, exfoliated vermiculite, or a mixture thereof, which has been impregnated with one of the indicator dyes previously described which exhibits protein error, followed by drying, and which is adhesively secured to sheet 15. Particulate material 17 comprises cellulose powder, alumina, silica gel, exfoliated vermiculite, or a mixture thereof, which has been impregnated or otherwise treated with a solution of buffer salt or an acid such as described above, and then dried to maintain the pH of the urine, with which the device will come in contact during testing, at a pH which is within or below the range through which the indicator changes color as a result of changes in pH.

Further referring to FIG. 3, it shows another embodiment of my invention wherein a sheet 18 of material, which may be hydrophilic absorbent paper, such as rice paper, has adhesively secured to it a layer comprising particulate material 19 such as cellulose, alumina, silica gel, exfoliated vermiculite, or a mixture thereof, which has been impregnated or otherwise treated with a solution of an indicator material which undergoes protein error and then dried. A second sheet 21 which may be identical with sheet 18 has adhesively secured to it a layer of particulate material 22a of powdered cellulose, alumina, silica gel, exfoliated vermiculite, or a mixture thereof, which particulate material has been impregnated with a solution of buffer salt or an acid and then dried. Adhesively securing the two thus-coated sheets 18 and 21 together, is a sheet 22 of a preferably hydrophilic, absorbent material such as rice paper, the adhesive being selected, for example, from any of the numerous well-known pressure sensitive adhesives used in the manufacture of pressure sensitive tapes, and the like. It is preferably treated with a wetting agent, and dried if necessary, to make it more hydrophilic.

The embodiment in FIG. 4 illustrates a laminate formed of superimposed sheets of hydrophilic absorbent material wherein sheet 23a is a hydrophilic, absorbent material, such as filter paper or rice paper, and 24 is a sheet of hydrophilic, absorbent material, also a paper, containing a layer of particulate material 24a, the layer being formed of a mixture of particles, such as cellulose powder, one part of the mixture being untreated while the remaining part has been impregnated with a solution of a buffer salt, dried, and after mixing with the untreated portion, adhesively secured to sheet 24. Sheet 25 is likewise a hydrophilic, absorbent sheet material which has been coated with a layer of particulate material 26 this being a mixture of particles, such as cellulose powder, one part of the mixture being untreated, while the remaining part has been impregnated with a solution of an indicator material which exhibits protein error, dried, mixed with the untreated powder, and the mixture then coated onto sheet 25. The sheets 23, 24 and 25 are laminated together by the use of adhesives; only sufficient adhesive is used to secure the laminates one to the other, as by spotting, without substantially interfering with the hydrophilic, absorptive character of the laminate so that when a sample of urine to be tested is applied to the top or bottom layer of the laminate, or if the laminate is immersed in a sample of urine, there will be permeation of the liquid through the components of the laminate.

The buffer and indicator in the foregoing embodiments can be applied to the particulate absorbent material in the form of a spray, as by application from an aerosol can containing the buffer composition or the indicator composition, it being understood of course that the particulate, absorbent material containing the buffer components, and the particulate, absorbent material containing the indicator compound be dried before being placed in proximity to each other.

With further reference to FIG. 5, the device there shown comprises a sheet 28 of a material which may be either an absorbent hydrophilic material, such as paper, or may be water-insoluble plastic material. Adhesively secured to at least one surface of sheet 28 is a uniform, continuous layer of agglomerates 29. These agglomerates may be of any suitable size, conveniently from about 10 mesh to 50 mesh, although the particle size is not precisely critical. These agglomerates have been prepared by pressing the dried mixture of particles such as those described in connection with FIG. 1, and the resulting compressed frangible structure particulated to form the agglomerates. These are adhesively secured to the surface of the carrier conveniently by the use of a suitable adhesive. An additional sheet (not shown) may be superimposed over the agglomerates shown in FIG. 5 so as to have them sandwiched between two sheets, at least one of which is preferably a hydrophilic, absorbent material such as paper.

For purposes of illustration, the following specific examples will describe the invention in greater detail, it being understood that variations within the scope of the invention will occur to those skilled in the art.

Example I 15 g. of a 2:1 mixture of anhydrous citric acid and sodium citrate dihydrate is dissolved in
100 ml. water. This solution is then added to
10 g. of finely divided chemically purified wood cellulose particles (alpha-cellulose) which vary typically from about 15–25 microns in diameter and 35–165 microns in average length, thoroughly mixed and when the particles have been thoroughly wetted, excess liquid is removed, and the thus impregnated, finely divided particles dried at 100° C.

Another solution is made up consisting of 0.005 g. Tetrabromphenol blue dissolved in 100 ml. of water, and 10 g. chemically purified wood cellulose particles, as described above, are mixed with the aqueous solution of the dye until thoroughly wetted, excess liquid removed and the thus-treated cellulose is then dried at 100° C.

The dry buffer-impregnated particles are then thoroughly mixed with the dry Tetrabromphenol blue-impregnated particles.

A sheet of Eaton and Dikeman Filter Paper No. 615 is lightly coated with an adhesive by spraying it with Adhesive Spray No. 77, previously described, and the two portions of dry impregnated cellulose particles, after thorough mixing, are applied thereover to form a uniform coating or layer.

When dipped momentarily into a specimen of urine containing 0.5% albumin and then withdrawn, the afore-said test strip turns bluish-green to blue. In the absence of albumin it remains yellow.

Example II

The procedure of Example I was followed, except that to the mixture of the two dried batches of cellulose powder, one of which had been impregnated with an aqueous solution of the buffer, and one with dye, there was added in dry form an alpha-cellulose powder equal in weight to one of the batches of treated cellulose. The resulting mixture was then applied to a paper carrier as in Example I. When the resulting device is contacted with a urine specimen containing 0.5% albumin and then withdrawn, it quickly turns bluish-green in color.

Example III

The procedure of Example II was followed, except that after the two batches of treated wood cellulose powders were prepared, the buffer-impregnated dry powder was applied to one face of a strip of Eaton and Dikeman Filter Paper No. 615 which had been first treated with sprayed-on adhesive as in Example I. The indicator-impregnated batch of cellulose powder was applied in a similar manner to a second sheet of adhesive-treated paper. The two sheets were then adhesively secured together with the coated sides being in face-to-face relationship.

Example IV

The procedure of Example III was followed, except that after the two sheets were prepared, a separator sheet of rice paper was placed therebetween and secured thereto with the spray-on adhesive as in Example I to form an integral unitary test device.

Example V

A test device was prepared as follows: The buffer solution described in Example I was impregnated into a sheet of Eaton and Dikeman Filter Paper No. 615 which was then dried at 100° C. A second sheet of similar filter paper was immersed in the indicator solution of Example I and it, too, dried at 100° C. A laminate was then prepared by adhesively securing, using Spray-on Adhesive 77 in face-to-face relationship to each other, as a first layer a sheet of rice paper, a second inner layer of the buffer-impregnated paper, a third, or inner, layer of unimpregnated filter paper, a fourth layer of the indicator-impregnated paper, and a fifth, or outer, layer of rice paper.

By the term "ultimate basic color," as used in this application, I mean that color which manifests itself when further increases in pH do not further intensify the depth of that color. For example, in the case of Tetrabromphenol blue, which undergoes a color change through the range of pure yellow to pure blue when going from a pH of 3.0 to 4.6, the ultimate basic color is manifested at pH 4.6.

While the foregoing description has been directed to the formation of "a layer" of particulate, hydrophilic, absorptive material, it is to be understood, of course, that such "layer" may be a composite of coatings or layers built up successively to any desired thickness.

It is to be understood that the foregoing description and the examples have been given only by way of illustration, and that the product is susceptible of variations without departing from the scope of the invention, which is limited only by the claims which follow.

What is claimed is:

1. A testing device for determining the presence of albumin in urine, comprising a carrier having uniformly applied over at least a portion of one surface thereof a layer of particulate hydrophilic absorptive material in the form of agglomerates which have been formed by first compressing into a compacted form a mixture of (a) particulate material which has been prepared by first impregnating one portion of particulate hydrophilic absorptive material with a solution of indicator which exhibits protein error and then drying and (b) particulate material which has been prepared by first impregnating a second portion of particulate hydrophilic absorptive material with a solution of a buffer and then drying, and then particulating said compacted form to form agglomerates comprising the two kinds of discrete particles of hydrophilic absorptive material and the indicator and buffer with which said particles have been impregnated.

2. The device of claim 1 wherein said particulate material is powdered cellulose.

3. The device of claim 1 wherein said particulate material is silica gel.

4. The device of claim 1 wherein said particulate material is aluminum oxide.

5. The device of claim 1 wherein the particulate material is exfoliated vermiculite.

6. The device of claim 1 wherein said agglomerates have a particle size of from about 10 to about 50 mesh.

7. The device of claim 1 wherein said buffer is an acidic buffer for maintaining the pH of the urine which comes into contact with said carrier below the point at which the ultimate basic color of said indicator is manifested.

8. A testing device for determining the presence of albumin in urine, comprising a laminate formed of (a) a first hydrophilic sheet having a thickness of hydrophilic absorbent particles adhesively secured to a surface thereof, said particles having been prepared by first impregnating hydrophilic absorbent particulate material with a solution of indicator which exhibits protein error and then drying, and (b) a second hydrophilic sheet adhesively secured to said first sheet, said second sheet having a thickness of hydrophilic absorbent particles adhesively secured to a surface thereof, said particles having been prepared by first impregnating hydrophilic absorbent particulate material with a solution of a buffer and then drying.

9. The testing device of claim 8 which further includes an absorbent hydrophilic sheet disposed between and separating the two said particle-bearing sheets.

10. A testing device for determining the presence of albumin in urine, comprising a carrier having secured to a portion of one surface thereof a mixture of particulate material in compacted form comprising (a) particulate material which has been prepared by first impregnating one portion of particulate hydrophilic absorptive material with a solution of indicator which exhibits protein error and then drying and of (b) particulate material which has been prepared by first impregnating a second portion of particulate hydrophilic absorptive material with a solution of a buffer and then drying.

References Cited
UNITED STATES PATENTS

| | | | |
|---|---|---|---|
| 3,095,277 | 6/1963 | Free et al. | 23—253 TP |
| 3,438,737 | 4/1969 | Atkinson et al. | 23—253 TP X |
| 3,043,669 | 7/1962 | Charles | 23—253 TP |
| 2,850,359 | 9/1958 | Worthington et al. | 23—253 TP X |
| 3,350,175 | 10/1967 | McConnaughey et al. | 23—253 TP X |
| 2,249,867 | 7/1941 | Snelling | 23—253 TP X |
| 3,317,283 | 5/1967 | King | 23—253 TP |
| 3,420,205 | 1/1969 | Morison | 23—253 TP X |

JOSEPH SCOVRONEK, Primary Examiner